(12) United States Patent
Arikawa

(10) Patent No.: US 7,295,405 B2
(45) Date of Patent: Nov. 13, 2007

(54) DISK DRIVE CAPABLE OF RESTRICTING UNEXPECTED MOVEMENT OF A HEAD SUSPENSION USING A LATCH MEMBER TO RESTRICT MOVEMENT OF THE SUSPENSION AND ELASTICITY OF THE SUSPENSION TO ENABLE A HEAD LOAD TAB TO MOVE DOWN A RAMP INCLINED SURFACE

(75) Inventor: Yoshihiro Arikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/996,923

(22) Filed: Nov. 24, 2004

(65) Prior Publication Data

US 2006/0044696 A1 Mar. 2, 2006

(30) Foreign Application Priority Data

Sep. 1, 2004 (JP) .............................. 2004-254117

(51) Int. Cl.
*G11B 5/54* (2006.01)
(52) U.S. Cl. ................................. 360/254.7; 360/254.8
(58) Field of Classification Search ............. 360/256.4, 360/254.7–255
See application file for complete search history.

(56) References Cited

U.S. PATENT DOCUMENTS 5,189,576 A * 2/1993 Morehouse et al. ..... 360/256.4
5,448,436 A * 9/1995 Albrecht ................... 360/256.4
6,507,461 B1 * 1/2003 Kimura et al. ............ 360/256.4
6,639,758 B2 10/2003 Ohta et al.
2005/0057857 A1 * 3/2005 Kawakami et al. ...... 360/256.4

FOREIGN PATENT DOCUMENTS

| JP | 11-086476 | 3/1999 |
| JP | 11-110933 | 4/1999 |

* cited by examiner

*Primary Examiner*—A. J. Heinz
(74) *Attorney, Agent, or Firm*—Greer, Burns & Crain, Ltd.

(57) ABSTRACT

A guiding passage is formed on a ramp member. The guiding passage defines an inclined surface angled towards plane including the surface of a recording disk at a position toward an inoperative position. A restriction member is allowed to restrict the movement of the load tab on the inclined surface when the load tab moves from the inoperative position toward the recording disk. If an impact acts on a recording disk drive when the recording disk stands still, the restriction member serves to restrict the movement of the load tab on the inclined surface. The elasticity of a head suspension enables the load tab to move down the inclined surface. The downward movement of the load tab causes a reduction in deformation of the head suspension. The head suspension thus receives a smaller load.

5 Claims, 6 Drawing Sheets

DISK DRIVE CAPABLE OF RESTRICTING UNEXPECTED MOVEMENT OF A HEAD SUSPENSION USING A LATCH MEMBER TO RESTRICT MOVEMENT OF THE SUSPENSION AND ELASTICITY OF THE SUSPENSION TO ENABLE A HEAD LOAD TAB TO MOVE DOWN A RAMP INCLINED SURFACE

BACKGROUND OF THE INVENTION

1. Field of the Invention

The present invention relates to a recording disk drive such as a hard disk drive (HDD). In particular, the invention relates to a recording disk drive comprising a recording disk and a ramp member located at a location outside the recording disk.

2. Description of the Prior Art

A ramp member is often incorporated in a HDD, for example. The ramp member defines a guiding passage extending along a path of movement of a load tab. The load tab is usually attached to the tip end of a head actuator. When a magnetic recording disk stands still, the ramp member receives the load tab at an inoperative position on the guiding passage. The guiding passage includes a first flat surface parallel with the surface of the magnetic recording disk. An inclined surface extends from the outer end of the first flat surface, and is inclined towards the plane of the magnetic recording disk in the direction of the inoperative position. A second flat surface is connected to the outer end of the inclined surface. The inoperative position is defined on the second flat surface.

A so-called latch mechanism is often incorporated in the HDD. The latch mechanism includes a restriction member swinging around a predetermined support shaft. Here, assume that an impact acts on the enclosure of the HDD around a support shaft of the head actuator when the magnetic recording disk stands still. The head actuator is caused to swing around the support shaft. At the same time, the restriction member is caused to swing. The restriction member gets into the path of movement of the head actuator. When the load tab moves from the inoperative position to a restriction position on the guiding passage, the restriction member catches the head actuator. The load tab is thus held at the restriction position. Contact is prevented between the head slider and the surface of the magnetic recording disk.

In the aforementioned HDD, when the restriction member catches the head actuator, the load tab stays at the first flat surface. Since the first flat surface is located further from the surface of the magnetic recording disk than the second flat surface, the head suspension largely deforms as compared with the case where the load tab is held at the inoperative position. In other words, the head suspension suffers from a larger load. It is desirable to suppress the load on the head suspension as much as possible.

SUMMARY OF THE INVENTION

It is accordingly the object of the present invention to provide a recording disk drive capable of suppressing load acting on a head suspension when a recording disk stands still.

According to a first aspect of the present invention, there is provided a recording disk drive comprising: a recording disk; a head suspension designed to support a head slider; a load member defined at the tip end of the head suspension; a ramp member located outside of the recording disk so as to receive the load member at an inoperative position when the recording disk stands still; a guiding passage formed on the ramp member and defining an inclined surface angled towards a reference plane including the surface of the recording disk as it approaches the inoperative position; and a restriction member designed to restrict movement of the load member on the inclined surface when the load member moves from the inoperative position toward the recording disk.

If an impact acts on the recording disk drive when the recording disk stands still, the restriction member serves to restrict the movement of the load member on the inclined surface. Since the load member is held on the inclined surface, the elasticity of the head suspension enables a downward movement of the load member along the inclined surface. The downward movement causes a reduction in deformation of the head suspension. The head suspension is thus allowed to receive a smaller load.

The recording disk drive may allow the inclined surface to further extend outward in the radial direction of the recording disk beyond the inoperative position. In this case, the extension of the inclined surface beyond the inoperative position enables a reliable positioning of the inoperative position on the inclined surface. Even if the accuracy of positioning the ramp member is loosened relative to the recording disk, the inoperable position of the load member can be positioned on the inclined surface. On the other hand, in the case where a flat surface is defined right beyond the inoperative position, a slight misalignment will cause the load member to be positioned on the flat surface. The load member fails to reach the inoperative position in some cases.

In general, the movement of the load member upon an impact acting on the recording disk drive is set to coincide with the restriction by the restriction member. Accordingly, the load member should start moving from the inoperative position when the restriction member restricts the movement of the load member. The recording disk drive of the invention enables a reliable return of the load member at the inoperative position based on the elasticity of the head suspension even if the recording disk drive receives an impact when the recording disk stands still. The load member is forced to start moving from the inoperative position. The movement of the load member synchronizes with the operation of the restriction member. The movement of the load member is surely restricted. The load member is surely prevented from taking off from the ramp member. The head slider is thus reliably prevented from colliding against or contacting the recording disk.

The inclined surface may comprise: a first inclined passage angled towards the reference plane in a radially outward direction of the recording disk along a first imaginary plane intersecting with the reference plane by a first inclination angle; and a second inclined passage located at a position outside the first inclined passage and angled towards the reference plane in a radially outward direction of the recording disk along a second imaginary plane intersecting with the reference plane by a second inclination angle smaller than the first inclination angle.

According to a second aspect of the present invention, there is provided a recording disk drive comprising: a recording disk; a head suspension designed to support a head slider; a load member defined at the tip end of the head suspension; and a ramp member located at a location outside the recording disk so as to receive the load member at an inoperative position when the recording disk stands still, wherein the ramp member defines an inclined surface designed to convert the elasticity of the head suspension to a driving force to move the load member to the inoperative position.

If an impact acts on the recording disk drive when the recording disk stands still, the restriction member serves to restrict the movement of the load member on the inclined surface. Since the load member is held on the inclined surface, the elasticity of the head suspension enables a downward movement of the load member along the inclined surface. The downward movement causes a reduction in deformation of the head suspension. The head suspension is thus allowed to receive a smaller load.

In addition, the load member is allowed to surely start moving from the inoperative position. The load member always starts moving from the inoperative position when the restriction member restricts the movement of the load member. The movement of the load member synchronizes with the operation of the restriction member. The movement of the load member is surely restricted. The load member is surely prevented from taking off from the ramp member. The head slider is thus reliably prevented from colliding against or contacting the recording disk.

The inclined surface may comprise: a first inclined passage angled towards the reference plane in a radially outward direction of the recording disk along a first imaginary plane intersecting with the reference plane by a first inclination angle; and a second inclined passage located at a position outside the first inclined passage and angled towards the reference plane in a radially outward direction of the recording disk along a second imaginary plane intersecting with the reference plane by a second inclination angle smaller than the first inclination angle.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
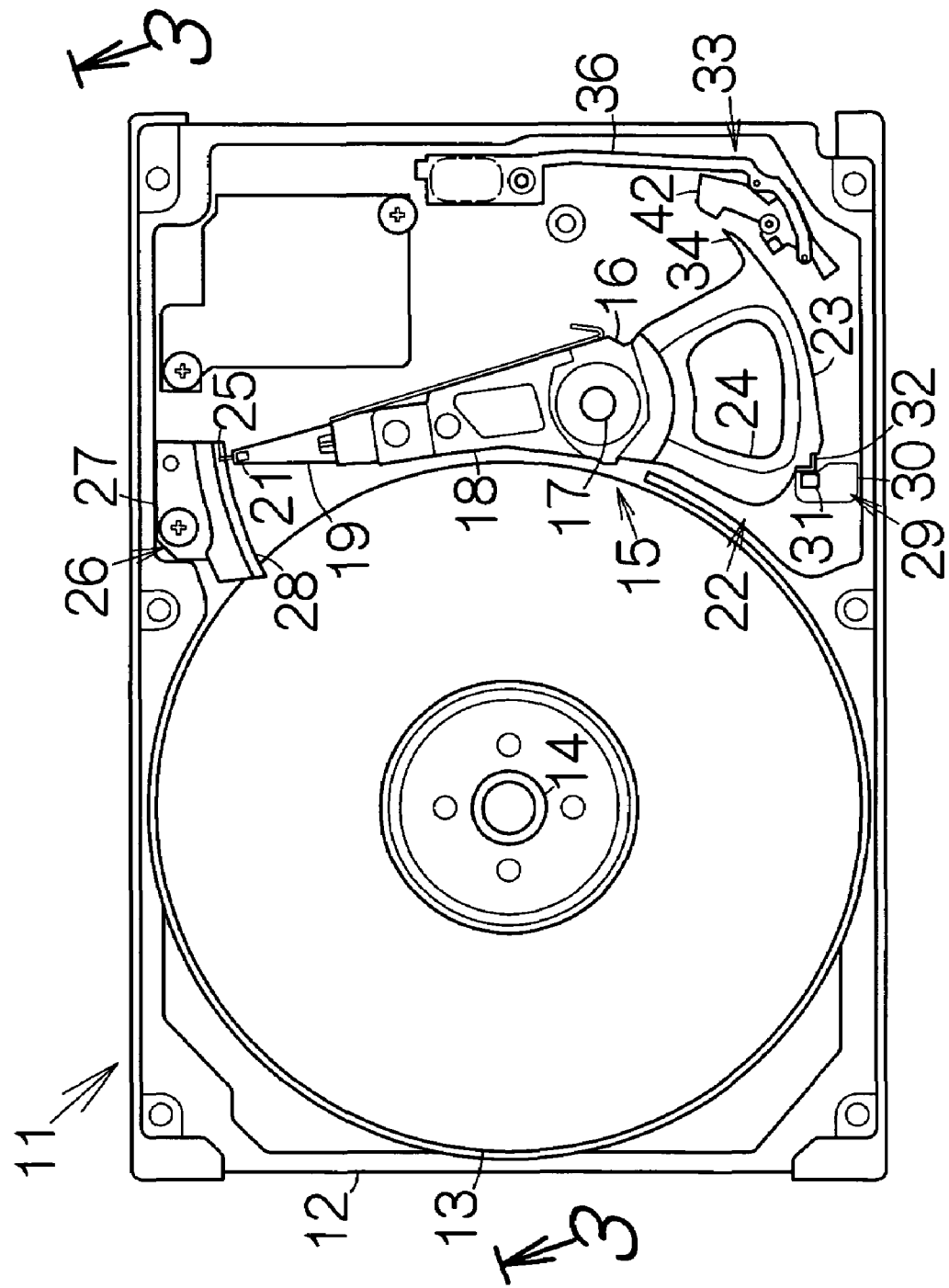
FIG. 1 is a plan view schematically illustrating the inner structure of a hard disk drive (HDD) as an example of a recording disk drive according to an embodiment of the present invention.

FIG. 1 schematically illustrates the inner structure of a hard disk drive (HDD) 11 as an example of a recording disk drive or storage device according to an embodiment of the present invention. The HDD 11 includes a box-shaped main enclosure 12 defining an inner space of a flat parallelepiped, for example. At least one magnetic recording disk 13 is mounted on the driving shaft of a spindle motor 14 within the main enclosure 12. The spindle motor 14 is allowed to drive the magnetic recording disk or disks 13 for rotation at a higher revolution speed such as 5,400 rpm, 7,200 rpm, 10,000 rpm, 15,000 rpm, or the like, for example. A cover, not shown, is coupled to the main enclosure 12 so as to define the closed inner space between the main enclosure 12 and the cover itself.

A head actuator 15 is also accommodated in the inner space of the main enclosure 12. The head actuator 15 comprises an actuator block 16. The actuator block 16 is coupled to a vertical support shaft 17 for relative rotation. Rigid actuator arms 18 are defined in the actuator block 16 so as to extend in the horizontal direction from the vertical support shaft 17. The actuator block 16 may be made of aluminum. Extrusion molding process may be employed to form the actuator block 16.

Head suspensions 19 are fixed to the corresponding tip ends of the actuator arms 18 so as to further extend in the forward direction from the actuator arms 18. A gimbal spring, not shown, is connected to the tip end of the individual head suspension 19. A flying head slider 21 is fixed on the surface of the gimbal spring. The gimbal spring allows the flying head slider 21 to change its attitude relative to the head suspension 19.

An electromagnetic transducer, not shown, is mounted on the flying head slider 21. The electromagnetic transducer may include a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel junction film, for example.

When the magnetic recording disk 13 rotates, the flying head slider 21 is allowed to receive airflow generated along the rotating magnetic recording disk 13. The airflow serves to generate a positive pressure or lift and a negative pressure on the flying head slider 21. The flying head slider 21 is thus allowed to keep flying above the surface of the magnetic recording disk 13 during the rotation of the magnetic recording disk 13 at a higher stability established by the balance between the urging force of the head suspension 19 and the combination of the lift and the negative pressure.

When the head actuator 15 is driven to swing about the vertical support shaft 17 during the flight of the flying head slider 21, the flying head slider 21 is allowed to move along the radial direction of the magnetic recording disk 13. This radial movement allows the electromagnetic transducer on the flying head slider 21 to cross a data zone between the innermost recording track and the outermost recording track. The flying head slider 21 can thus be positioned right above a target recording track on the magnetic recording disk 13.

A voice coil motor (VCM) 22 is coupled to the actuator block 16. A coil member 23 is formed in the actuator block 16 so as to extend in a horizontal direction from the vertical support shaft 17. The coil member 23 may be integral to the actuator block 16. A coil 24 of the voice coil motor 22 is wound around the coil member 23. The coil member 23 is opposed to a permanent magnet, not shown, fixed to the main enclosure 12, for example. When a magnetic field is generated in the coil 24 in response to supply of electric power, the rotation of the head actuator 15 is realized.

A load member or load tab 25 is attached to the front or tip end of the head suspension 19 so as to further extend in the forward direction from the head suspension 19. The load tab 25 is allowed to move in the radial direction of the magnetic recording disk 13 based on the swinging movement of the head actuator 15. A ramp member 26 is located outside the magnetic recording disk 13 on the path of movement of the load tab 25. The ramp member 26 includes an attachment base 27 screwed in the bottom plate of the main enclosure 12 at a location outside the magnetic recording disk 13, for example. The attachment base 27 includes a ramp body 28 extending from the attachment base 27 along a horizontal plane toward the vertical support shaft 17 of the head actuator 15. The ramp body 28 may be integral to the attachment base 27 based on molding, for example. The tip end of the ramp body 28 is opposed to a non-data zone outside the outermost recording track. The combination of the load tab 25 and the ramp member 26 establishes a so-called load/unload mechanism. The ramp member 26 may be made of a hard plastic material, for example.

A retention mechanism 29 is related to the head actuator 15. The retention mechanism 29 includes a permanent magnet 31 held in an attachment member 30, and a metallic piece 32 opposed to the permanent magnet 31. The attachment member 30 is made of an elastic resin material such as rubber, for example. The attachment member 30 is fixed to the bottom plate of the main enclosure 12, for example. The metallic piece 32 is fixed to the end of the coil member 23. The magnetic field of the permanent magnet 31 acts on the metallic piece 32. The metallic piece 32 is thus drawn to the permanent magnet 31. When the head actuator 15 swings furthest in a normal direction, the metallic piece 32 is received on the permanent magnet 31. The load tab 25 is held at an inoperative position on the ramp member 26.

Figure 2:
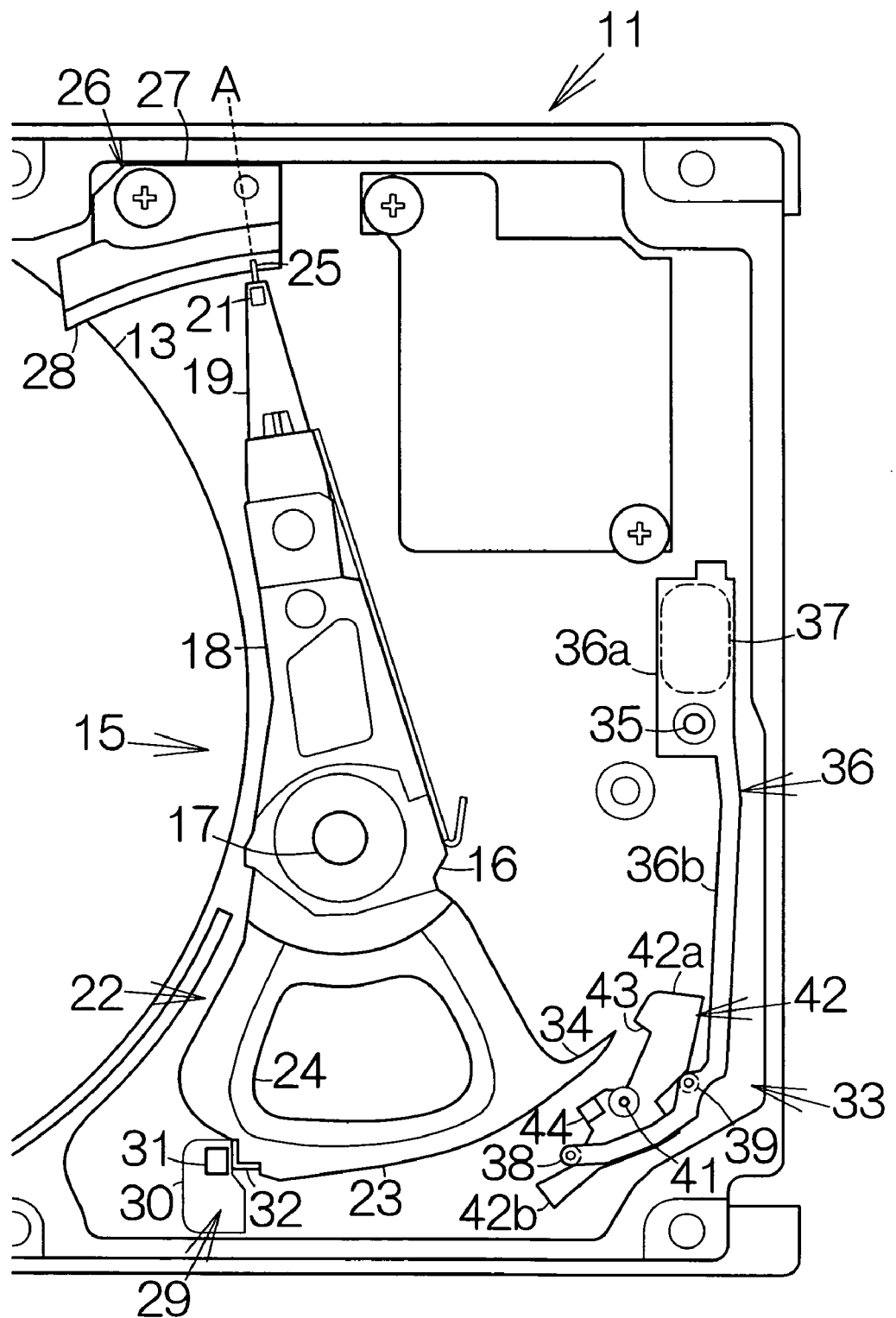
FIG. 2 is an enlarged partial plan view schematically illustrates the structure of the HDD.

As shown in FIG. 2, a restriction mechanism or latch mechanism 33 is also related to the head actuator 15. The latch mechanism 33 includes a protrusion 34 formed on the coil member 23. The protrusion 34 is located at the end opposite to the end where the metallic piece 32 is fixed. The protrusion 34 may be integral to the coil member 23 based on molding. The protrusion 34 is allowed to move along a predetermined path based on the swinging movement of the head actuator 15, namely of the coil member 23.

The latch mechanism 33 further includes a plate-shaped first swinging member 36 coupled to a vertical support shaft 35 for a relative swinging movement. The vertical support shaft 35 stands upright from the bottom plate of the main enclosure 12. The first swinging member 36 includes a main body 36a and an arm member 36b. The vertical support shaft 35 receives the main body 36a. The arm member 36b is designed to extend from the main body 36a along a horizontal plane. The arm member 36b may be integral to the main body 36a. The main body 36a and the arm member 36b may be made of metallic material, for example.

A weight 37 is attached to the back surface of the main body 36a. First and second contact pieces 38, 39 are formed on the arm member 36b. The first and second contact pieces 38, 39 are designed to protrude from the back surface of the arm member 36b toward the bottom plate of the main enclosure 12. The first contact piece 38 may be located at the tip end of the arm member 36b, for example. The second contact piece 39 may be spaced from the first contact piece 38 by a predetermined distance toward the root or base end of the arm member 36b. The first and second contact pieces 38, 39 may be formed in a columnar shape, for example. The first swinging member 36 is allowed to swing around the vertical support shaft 35 based on the inertial force of the weight 37.

The latch mechanism 33 further includes a second swinging member 42 coupled to a vertical support shaft 41 for a relative swinging movement. The vertical support shaft 41 stands upright from the bottom plate of the main enclosure 12. The second swinging member serves as a restriction member according to the present invention. The second swinging member 42 includes a first swinging piece 42a and a second swinging piece 42b. The first swinging piece 42a is designed to extend from the vertical support shaft 41 in a first direction along a horizontal plane. The second swinging piece 42b is designed to extend from the vertical support shaft 41 in a second direction opposite to the first direction in the horizontal plane. The second swinging member 42 may be made of a resin material, for example. Molding process may be employed to form the second swinging member 42. The first swinging piece 42a is opposed to the second contact piece 39. The second swinging piece 42b is opposed to the first contact piece 38. The second swinging piece 42b is located in a space between the first and second contact pieces 38, 39.

A receiving pocket 43 is formed in the first swinging piece 42a so as to receive the protrusion 34. A metallic chip 44 is attached to the second swinging piece 42b. The metallic chip 44 is drawn to the voice coil motor 22 based on the magnetic field acting from the permanent magnet of the voice coil motor 22. The second swinging piece 42b, namely the second swinging member 42, is in this manner held at an inoperative position. The first swinging piece 42a retreats from the path of movement of the protrusion 34. In this case, the first contact piece 38 is received on the second swinging piece 42b. Likewise, the second contact piece 39 is received on the first swinging piece 42a. The first swinging member 36 is held at an inoperative position in this manner.

Figure 3:
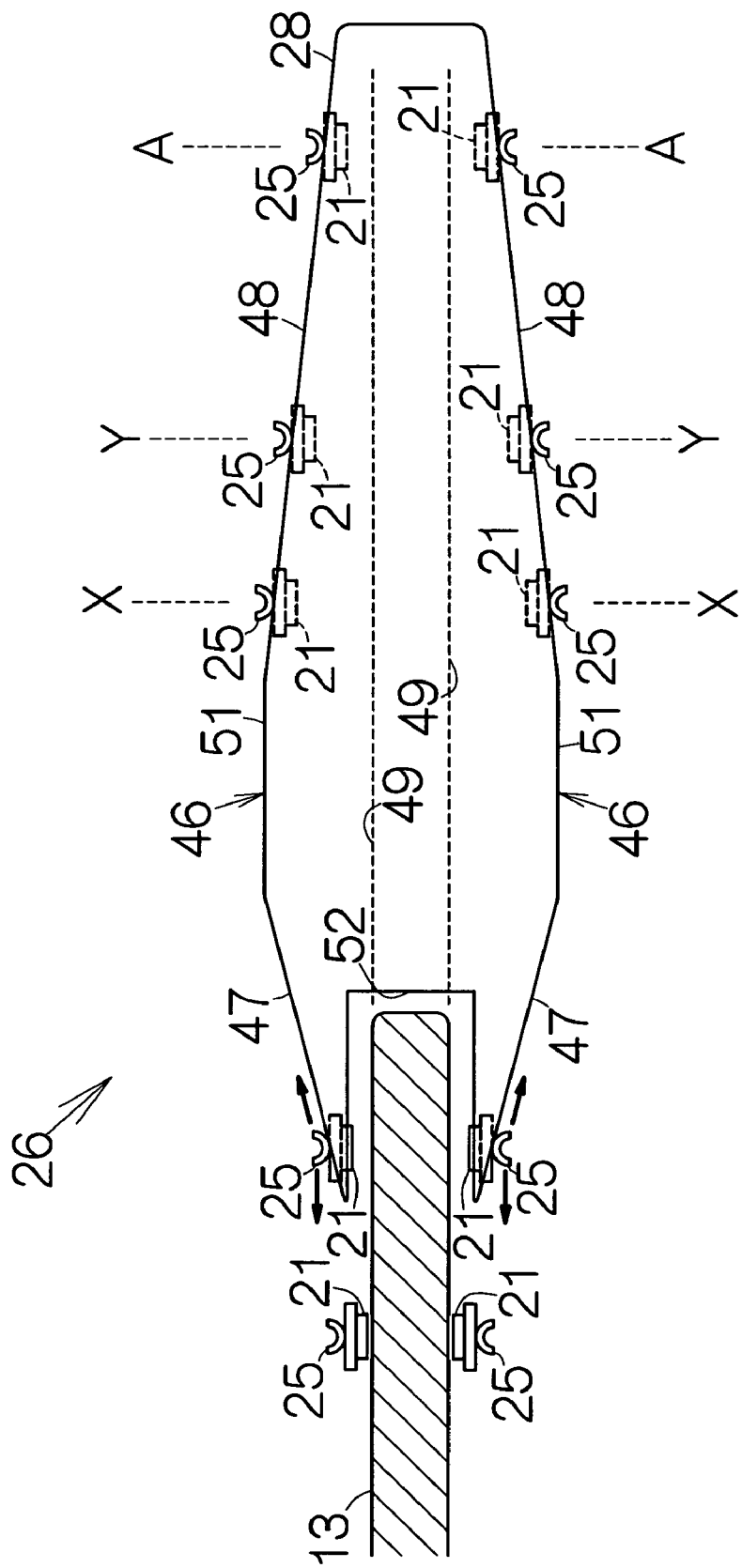
FIG. 3 is an enlarged partial sectional view of the HDD, taken along the line 3-3 in FIG. 1, for schematically illustrating the structure of a ramp member according to a first embodiment of the present invention.

FIG. 3 schematically illustrates the structure of the ramp member 26 according to a first embodiment of the present invention. Guiding passages 46, 46 are formed on the front and back surfaces of the ramp body 28. The Guiding passages 46, 46 are designed to extend from the inner end to the outer end in the radial direction of the magnetic recording disk 13 on the paths of movement of the load tabs 25. The individual guiding passage 46 includes first and second inclined surfaces 47, 48. The first inclined surface 47 is designed to extend from the front end toward the rear end of the ramp body 28. The second inclined surface 48 is designed to extend from the rear end toward the front end of the ramp body 28. The first inclined surfaces 47, 47 gradually get further from each other moving towards the rear end of the ramp body 28. On the other hand, the second inclined surfaces 48, 48 gradually get further from each other moving towards the front end of the ramp body 28. In other words, the second inclined surface 48 declines towards a reference plane 49 including the corresponding surface of the magnetic recording disk 13 at a location towards the rear end of the ramp body 28. Here, the second inclined surface 48 may extend beyond the inoperative position A until it reaches the rear end of the ramp 28. A flat surface may be employed as the second inclined surfaces 48.

The guiding passage 46 further includes a flat surface 51 connecting the first inclined surface 47 with the second inclined surface 48. The flat surface 51 is connected to the outer end of the first inclined surface 47 as well as to the inner end of the second inclined surface 48. The flat surface 51 may be defined in parallel with the aforementioned reference plane 49. A receiving indent or recess 52 is formed in the attachment base 27 and the ramp body 28. The recess 52 is designed to extend from the front end of the ramp body 28 toward the attachment base 27 in a space between the first inclined surfaces 47, 47. The recess 52 defines a space to receive insertion of the magnetic recording disk 13.

Now, assume that the magnetic recording disk 13 stops rotating. When read/write operation has been completed during the rotation of the magnetic recording disk 13, the voice coil motor 22 drives the head actuator 15 around the vertical support shaft 17 in the normal direction. The actuator arms 18 and the head suspensions 19 are driven to swing outside the magnetic recording disk 13. As shown in FIG. 3, when the flying head sliders 21 get opposed to the non-data zones or landing zones outside the outermost recording tracks, the load tabs 25 are allowed to contact the first inclined surfaces 47. A further swinging movement of the actuator arm 18 allows the load tabs 25 to continuously climb up the first inclined surfaces 47. Elasticity is stored up in the head suspensions 19 in response to deformation of the head suspensions 19. The load tabs 25 move further from the corresponding surfaces of the magnetic recording disk 13. A further swinging movement of the actuator arm 18 allows the load tab 25 to slide on the first inclined surface 47, the flat surface 51 and the second inclined surface 48 in this sequence. When the load tab 25 moves down the second inclined surface 48, the elasticity gradually decreases in the head suspension 19. When the load tab 25 arrives the farthest position outside the magnetic recording disk 13, the load tab 25 is positioned at the inoperative position A. The metallic piece 32 of the coil member 23 is received on the permanent magnet 31. The magnetic recording disk 13 then stops rotating. Since the load tabs 25 are reliably held on the ramp member 26, the flying head sliders 21 are prevented from colliding against or contacting the magnetic recording disk 13 even without any airflow acting on the flying head sliders 21. The flying head sliders 21 are thus effectively prevented from any attachment to a lubricant agent covering over the surfaces of the magnetic recording disk 13.

When the HDD 11 receives instructions to read or write magnetic information, the magnetic recording disk 13 starts rotating. The voice coil motor 22 drives the head actuator 15 around the vertical support shaft 17 in the reverse direction opposite to the aforementioned normal direction after the rotation of the magnetic recording disk 13 has entered the steady condition. The actuator arms 18 and the head suspensions 19 move toward the rotation axis of the magnetic recording disk 13. The load tab 25 is allowed to slide on the second inclined surface 48, the flat surface 51 and the first inclined surface 47 in this sequence. A further swinging movement of the actuator arm 18 causes the load tabs 25 to move down the first inclined surfaces 47. During the downward movement of the load tabs 25 along the first inclined surfaces 47, the flying head sliders 21 get opposed to the corresponding surfaces of the magnetic recording disk 13. Airflow generated along the surface of the magnetic recording disk 13 induces a lift on the flying head slider 21. Thereafter, a further swinging movement of the actuator arms 18 allows the load tabs 25 to take off from the first inclined surfaces 47, namely from the ramp member 26. Since the magnetic recording disk 13 rotate in the steady condition, the flying head sliders 21 are allowed to fly above the surfaces of the magnetic recording disk 13 without a support from the ramp member 26.

As shown in FIGS. 2 and 3, when the magnetic recording disk 13 stands still, the load tabs 25 are positioned at the inoperative position A. The magnetic field of the permanent magnet 31 forces the load tab 25 to stay at the inoperative position A on the guiding passage 46. Here, assume that a driving force is generated to drive the head actuator 15 based on an impact acting on the main enclosure 12. The inertial force causes the head actuator 15 to swing around the vertical support shaft 17 regardless of the magnetic filed of the permanent magnet 31. The coil member 23 is caused to swing around the vertical support shaft 17. The load tab 25 climbs up the second inclined surface 48 from the inoperative position A. Elasticity is thus stored up in the head suspension 19. At the same time, the inertial force of the weight 37 causes the first swinging member 36 to swing from the inoperative position around the vertical support shaft 35.

Figure 4:
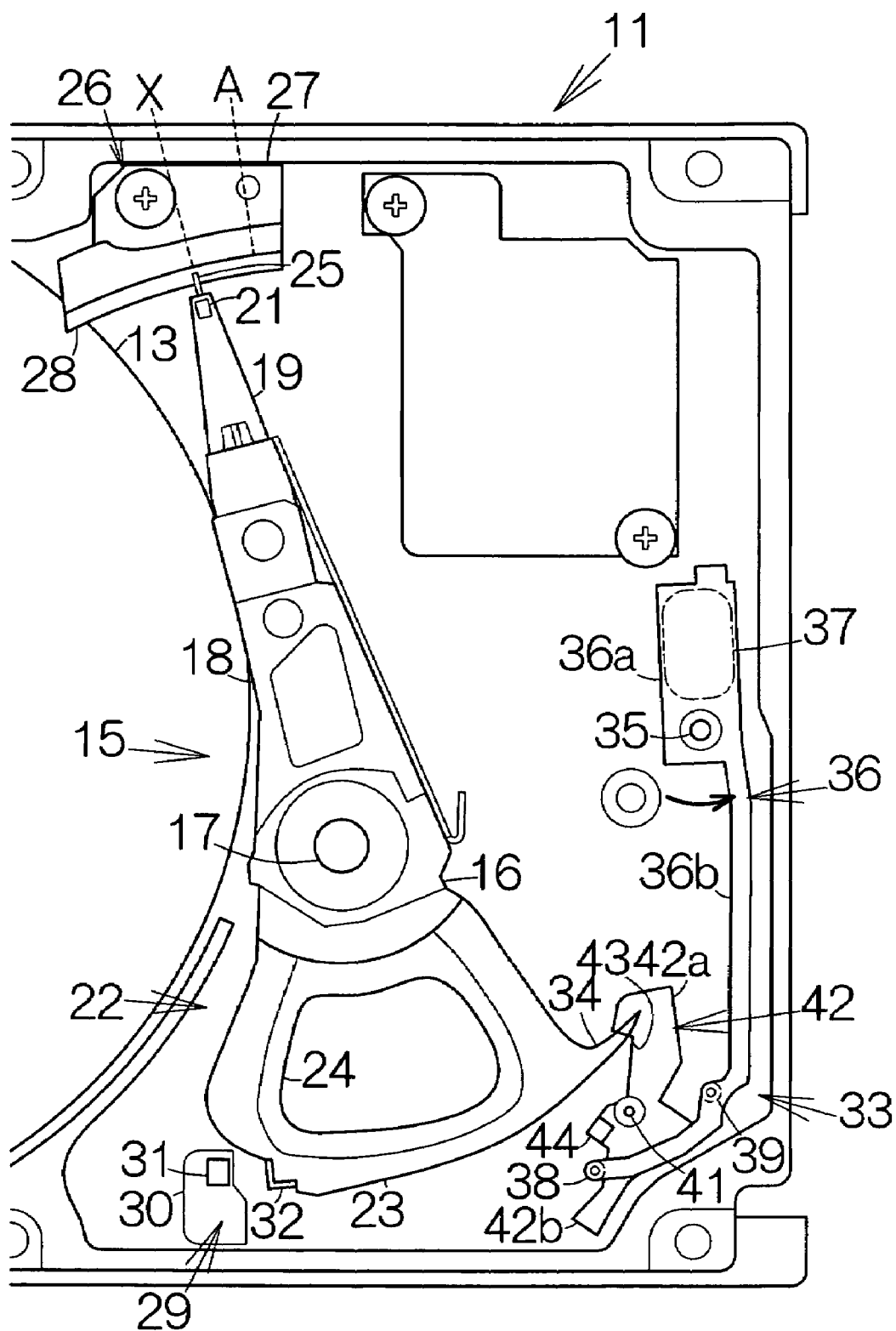
FIG. 4 is an enlarged partial plan view of the HDD, corresponding to FIG. 2, for schematically illustrating the ramp member holding a load tab at a restriction position.

Referring also to FIG. 4, when the first swinging member 36 swings in a first direction, for example, the first contact piece 38 of the first swinging member 36 collides against the second swinging piece 42b of the second swinging member 42. The collision causes the first and second swinging pieces 42a, 42b to swing around the vertical support shaft 41 in the second swinging member 42. The first swinging piece 42a is thus allowed to get into the path of movement of the protrusion 34. On the other hand, the load tab 25 is caused to slide on the guiding passage 46 toward the magnetic recording disk 13. When the load tab 25 reaches a restriction position X on the guiding passage 46, the protrusion 34 of the head actuator 15 is received in the receiving pocket 43 of the second swinging piece 42a. In this manner, the swinging movement of the head actuator 15 is restricted. The load tab 25 is thus prevented from further moving beyond the restriction position X toward the magnetic recording disk 13.

As is apparent from FIG. 3, since the restriction position X is defined on the second inclined surface 48, the elasticity of the head suspension 19 enables the load tab 25 to move down the second inclined surface 48. The head actuator 15 is caused to swing around the vertical support shaft 17. The coil member 23 is caused to swing around the vertical support shaft 17. When the load tab 25 reaches a release position Y defined outside the restriction position X in the radial direction of the magnetic recording disk 13, the protrusion 34 of the coil member 23 retreats from the receiving pocket 43. The elasticity of the head suspension 19 enables the head actuator 15 to further swing. The load tab 25 in this manner returns to the inoperative position A. The metallic piece 32 is received on the permanent magnet 31.

When the protrusion 34 has retreated from the receiving pocket 43, the metallic chip 44 of the second swinging member 42 is drawn to the permanent magnet of the voice coil motor 22. The second swinging member 42 swings in a reverse direction opposite to the aforementioned direction around the vertical support shaft 41. The first swinging piece 42a retreats from the path of movement of the protrusion 34. The second swinging piece 42b collides against the first contact piece 38. The collision serves to swing the first swinging member 36. When the second swinging member 42 returns to the inoperative position, the first swinging member 36 likewise returns to the inoperative position. Now, the first contact piece 38 receives the second swinging piece 42b. The second contact piece 39 receives the first swinging piece 42a.

Figure 5:
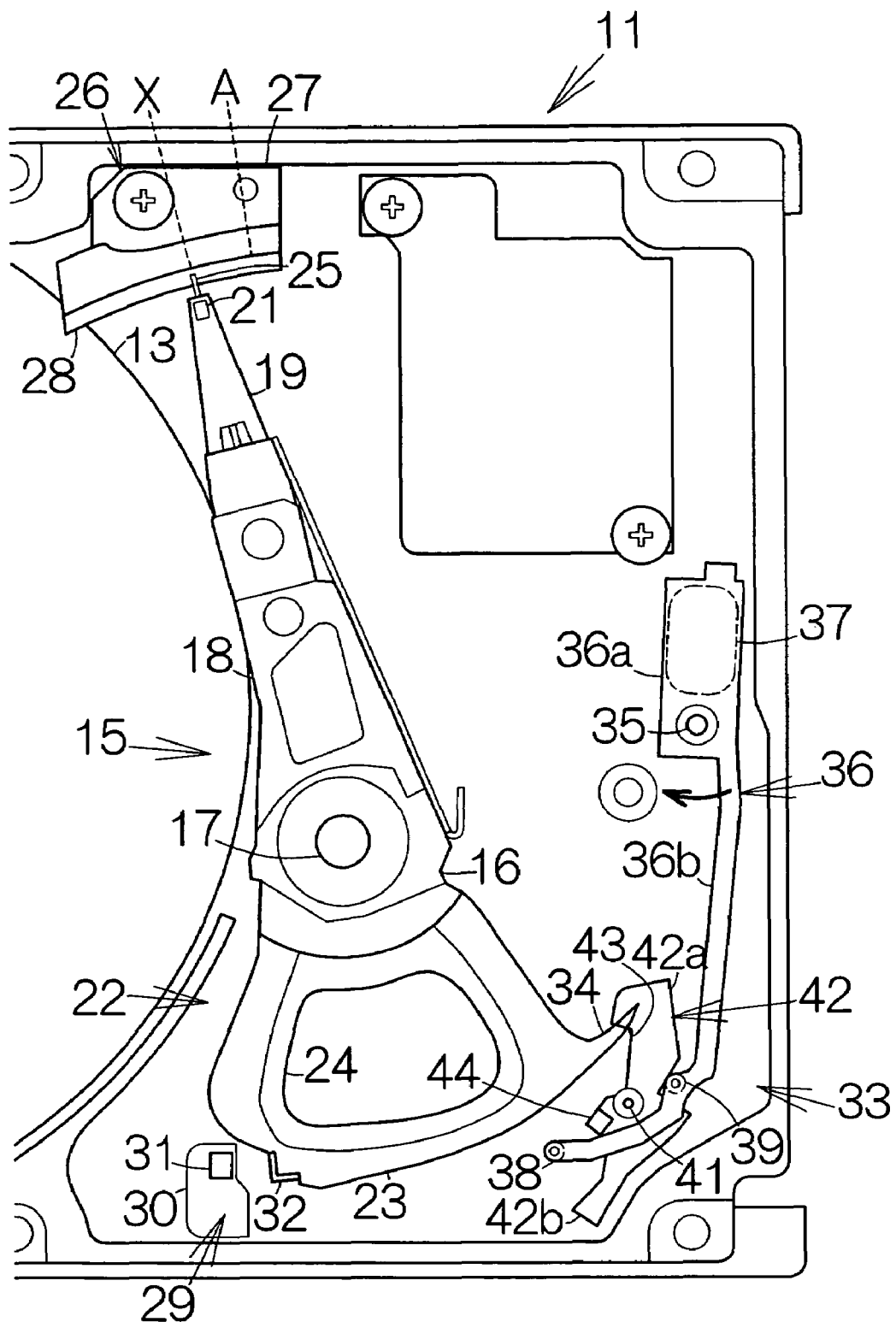
FIG. 5 is an enlarged partial plan view of the HDD, corresponding to FIG. 2, for schematically illustrating the ramp member holding the load tab at the restriction position.

Referring also to FIG. 5, assume that the first swinging member 36 swings in a second direction opposite to the aforementioned first direction. In this case, the second contact piece 39 collides against the first swinging piece 42a. The collision causes the first and second swinging pieces 42a, 42b to swing in the reverse direction opposite to the aforementioned direction around the vertical support shaft 41 in the second swinging member 42. The first swinging piece 42a gets into the path of movement of the protrusion 34. At the same time, the load tab 25 slides on the guiding passage 46 toward the magnetic recording disk 13. The load tab 25 climbs up the second inclined surface 48 from the inoperative position A. Elasticity is stored up in the head suspension 19. When the load tab 25 reaches the restriction position X on the guiding passage 46, the protrusion 34 of the head actuator 15 is received into the receiving pocket 43 of the second swinging piece 42a. The swinging movement of the head actuator 15 is thus restricted. The movement of the load tab 25 is restricted on the restriction position X. The second swinging member 42 thereafter returns to the inoperative position A based on the elasticity of the head suspension 19 in the same manner as described above. The first swinging member 36 returns to the inoperative position.

The HDD 11 enables a reliable restriction of the movement of the load tabs 25 based on the action of first and second swinging members 36, 42 when an impact acts on the main enclosure 12 of the HDD 11 around the vertical support shaft 17 of the head actuator 15. The load tab 25 stays on the second inclined surface 48 right after the restriction. The load tab 25 is thus allowed to move down the second inclined surface 48 with the assistance of the elasticity of the head suspension 19. Specifically, the second inclined surface 48 serves to induce a driving force to move the load tab 25 to the inoperative position A due to the elasticity of the head suspension 19. As the load tab 25 moves downward, the head suspension 19 is released from deformation. The deformation of the head suspension 19 can accordingly be suppressed when the magnetic recording disk 13 stands still.

In general, the swinging movement of the head actuator 15 upon an impact acting on the main enclosure 12 of the HDD 11 is set to coincide with the swinging movement of the first and second swinging members 36, 42. Accordingly, the load tab 25 should start moving from the inoperative position A, while the second swinging member 42 should start swinging from the inoperative position, so that the swinging movement of the head actuator 15 synchronizes with the swinging movement of the first and second swinging members 36, 42. As described above, the load tab 25 is forced to reliably stay at the inoperative position A. The load tabs 25 are thus allowed to surely start moving from the inoperative position A. Likewise, the first and second swinging members 36, 42 can be held at the inoperative position. The swinging movement of the head actuator 15, namely the movement of the load tab 25 is surely restricted upon an impact around the vertical support shaft 17. The load tab 25 is surely prevented from taking off from the ramp member 26. The flying head slider 21 is thus reliably prevented from colliding against or contacting the magnetic recording disk 13.

In addition, the second inclined surface 48 is designed to extend beyond the inoperative position A toward the rear end of the ramp member 26. Even if the accuracy of positioning the ramp member 26 is loosened relative to the head actuator 15, the inoperative position A of the load tab 25 can reliably be positioned on the second inclined surface 38. The load tab 25 is allowed to always reach the inoperative position A irrespective of the loosened positioning of the ramp member 26. On the other hand, in the case where a flat surface is defined right beyond the inoperative position A, a slight misalignment of the ramp member 26 will cause the load tab 25 to be positioned on the flat surface, so that the load tab 25 fails to reach the inoperative position A in some cases.

Figure 6:
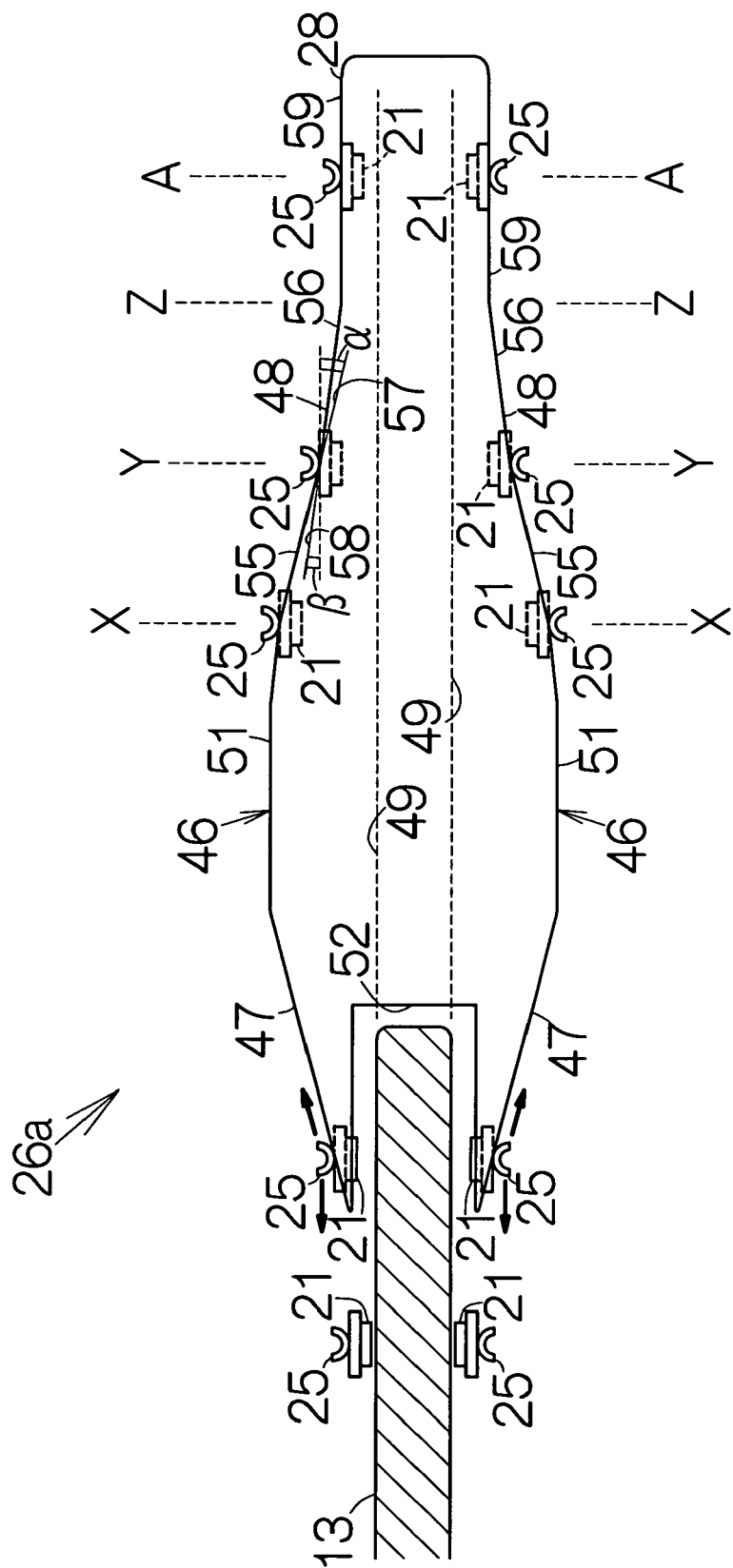
FIG. 6 is an enlarged partial sectional view of the HDD, corresponding to FIG. 3, for schematically illustrating the structure of a ramp member according to a second embodiment of the present invention.

FIG. 6 schematically illustrates the structure of a ramp member 26a according to a second embodiment of the present invention. The second inclined surface 48 of the ramp member 26a includes a first inclined passage 55 and a second inclined passage 56 connected to the outer end of the first inclined passage 55. The first inclined passage 55 is designed to approach the reference plane 49 in a radially outward direction of the magnetic recording disk 13. The first inclined passage 55 is formed along a first imaginary plane 57 intersecting with the reference plane 49 by a first inclination angle α, for example. The first inclined passage 55 may intersect with the reference plane 49 by an angle larger than that of the second inclined surface 48 of the aforementioned first embodiment.

The second inclined passage 56 is likewise designed to approach the reference plane 49 in a radially outward direction of the magnetic recording disk 13. The second inclined passage 56 is formed along a second imaginary plane 58 intersecting with the reference plane 49 by a second inclination angle β, for example. The second inclination angle β is set smaller than the first inclination angle α. A flat surface 59 is connected to the outer end of the second inclined surface 48, namely the second inclined passage 56. The flat surface 59 is designed to extend toward the rear end of the ramp 28. The inoperative position A is defined on the flat surface 59.

A boundary position Z is defined on the guiding passage 46 between the second inclined surface 48 and the flat surface 59. The first inclined passage 55 may be defined between the restriction position X and the release position Y. The second inclined passage 56 may be defined between the release position Y and the boundary position Z. Two or more flat surfaces may be employed to form the second inclined surface 48 in this manner. Like reference numerals are attached to components or structures equivalent to those of the aforementioned first embodiment.

Now, assume that a driving force is generated to swing the head actuator 15 due to an impact acting on the main enclosure 12 when the magnetic recording disk 13 stands still. The first and second swinging members 36, 42 serve to restrict the movement of the load tab 25 on the second inclined surface 48, namely on the first inclined passage 55. Since the first inclined passage 55 intersects with the reference plane 49 by an angle larger than that of the second inclined surface 48 of the first embodiment, the elasticity of the head suspension 19 enables the load tab 25 to surely move toward the inoperative position A. When the load tab 25 reaches the boundary position Z, the metallic piece 32 is drawn to the permanent magnet 31. In this manner, the load tabs 25 are allowed to surely return to the inoperative position A.

What is claimed is:
1. A disk drive comprising:
a head suspension designed to support a head slider;
a load member defined at a tip end of the head suspension;
a ramp member located at a location outside a recording disk so as to receive the load member at an inoperative position when the recording disk stands still;
a guiding passage formed on the ramp member and defining an inclined surface getting closer to a reference plane including a surface of the recording disk toward the inoperative position; and
a restriction member designed to restrict movement of the load member on the inclined surface when the load member moves from the inoperative position toward the recording disk, wherein after the movement of the load member is restricted, the load member slides on the inclined surface toward the inoperative position based on elasticity of the head suspension.

2. The disk drive according to claim 1, wherein the inoperative position is defined on the inclined surface.

3. The disk drive according to claim 1, wherein said inclined surface comprises:
a first inclined passage designed to get closer to the reference plane in a radially outward direction of the recording disk along a first imaginary plane intersecting with the reference plane by a first inclination angle; and
a second inclined passage directly connected to the first inclined passage at a position outside the first inclined passage and designed to get closer to the reference plane in a radially outward direction of the recording disk along a second imaginary plane intersecting with the reference plane by a second inclination angle smaller than the first inclination angle.

4. A disk drive comprising:
a head suspension designed to support a head slider;
a load member defined at a tip end of the head suspension; and
a ramp member located at a location outside a recording disk so as to receive the load member at an inoperative position when the recording disk stands still, wherein
said ramp member defines an inclined surface designed to convert elasticity of the head suspension to a driving force to slide the load member on the inclined surface to the inoperative position.

5. The disk drive according to claim 4, wherein said inclined surface comprises:
a first inclined passage designed to get closer to a reference plane including a surface of the recording disk in a radially outward direction of the recording disk along a first imaginary plane intersecting with the reference plane by a first inclination angle; and
a second inclined passage located at a position outside the first inclined passage and designed to get closer to the reference plane in a radially outward direction of the recording disk along a second imaginary plane intersecting with the reference plane by a second inclination angle smaller than the first inclination angle.

* * * * *